T. SCHULZE.
PROCESS FOR RECOVERING CAFFEINE.
APPLICATION FILED JAN. 8, 1920.
1,438,558.
Patented Dec. 12, 1922.
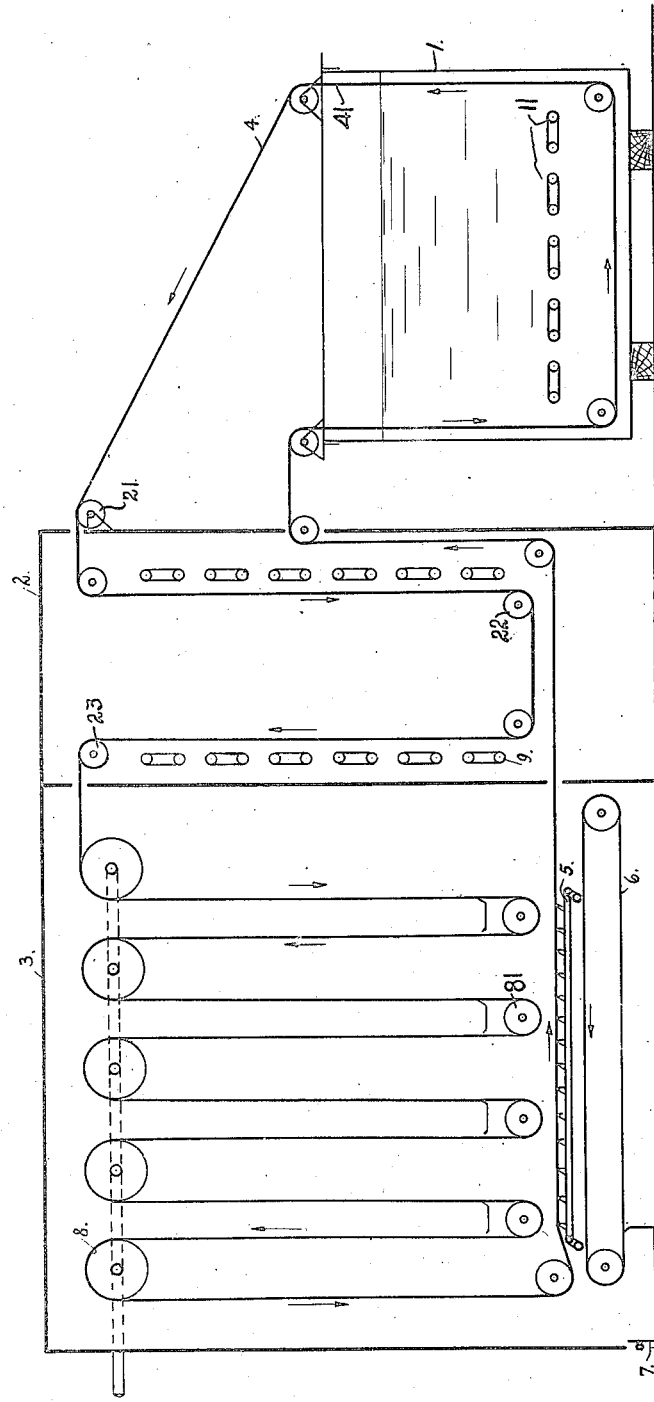
Inventor:
THEODORE SCHULZE
By Q. M. Austin
atty Patented Dec. 12, 1922.

1,438,558

UNITED STATES PATENT OFFICE.

THEODORE SCHULZE, OF CLEVELAND, OHIO.

PROCESS FOR RECOVERING CAFFEINE.

Application filed January 8, 1920. Serial No. 350,177.

*To all whom it may concern:*

Be it known that I, THEODORE SCHULZE, a citizen of the United States, and resident of Cleveland, in the county of Cuyahoga and State of Ohio, have invented certain new and useful Improvements in Processes for Recovering Caffeine, of which the following is a specification.

The invention relates to a process for recovering caffeine in crystalline form from solutions obtained by known treatments of green coffee incidental to decaffeinization processes and the invention further relates to an improved apparatus for practicing the recovering process.

The primary object of the invention is to provide a simplified and inexpensive process for obtaining pure caffeine in crystallized form from the usual solutions containing caffeine and with the least possible waste of material.

Another object of the invention is to provide a simple form of apparatus for effecting this recovery economically and continuously.

Broadly, I attain this invention by subjecting a prepared caffeine-containing solution while in bulk to a preliminary heat treatment at a temperature relatively high but below the boiling point of the solution. This temperature is preferably between 180° and 200° F. Small portions of the heated solution are then removed from the heating vat preferably in a continuous stream and these small amounts of the hot solution are subjected to a two-stage heat treatment, first to a dehydrating action to remove the water of solution and then to final heating treatment at relatively high temperatures to effect the crystallization from the heated residue. During the first step the solution is reduced to a dry coat on the carrier and at this point may be regarded as dehydrated. When the dehydrated substance is then subjected promptly to the second heating step for a relatively long time and at a temperature above 212° F. The crystals of caffeine will begin to form slowly on the carrier and eventually all of the caffeine present will be in crystal form. When this carrier is made of some absorbent material it constitutes a convenient means for separating the crystalline caffeine from the noncrystalline substance present for the impurities and water material adhere to the belt whereas the caffeine forms into characteristic flaky crystals, but in the absence of any such carrier the crystals may be separated mechanically by any known method.

For a more detailed disclosure of one commercial means for perfecting the method, reference is made to the accompanying drawings in which there is shown diagrammatically a suggested arrangement of a plant for practicing the process.

In the drawings there is shown in order from right to left a solution vat 1, which is designed to contain the solution of caffeine obtained in any of the usual decaffeinization processes. The solution is heated while in the vat by some convenient means such as the steam pipes 11 which are so regulated as to heat the solution at the suggested sub-boiling temperature. Next in order is a dehydrating chamber 2 provided with heating means, indicated diagrammatically by the pipes 9 and which may be steam pipes as was suggested for the heating of the vat 1. Next in order is a crystallizing chamber 3 provided with a removable hopper or tray 7 for receiving and withdrawing the finished crystalline product from the device.

An endless belt 4 preferably formed of some absorbent material, such as cheesecloth, has one portion thereof submerged below the level of the solution in the vat 1. The portion 41 of the belt which leaves the solution is vertically inclined so that any surplus liquid carried up by the belt will be permitted to drip back into the vat and in this way a limited and regulated amount of the solution is carried into the dehydrating chamber. The portion of the belt from the vat first passes over suitable rollers 21 adjacent the upper part of the chamber 2 and is then looped downwardly and upwardly about rollers 22 adjacent the lower portion of the dehydrating chamber. The belt is then passed about upper discharge rollers 23 and into the upper portion of the crystallizing chamber. In both the dehydrating chamber and the crystallizing chamber, there is featured relatively long vertical reaches of the belt so as to provide for the necessary time to effect the dehydrating of the solution in the chamber 2 and for effecting the crystallizing in the chamber 3. The belt with its relatively thin layer of dehydrated substance is passed over a plurality of heating drums 8 in the upper portion of the chamber 3 and is alternately looped about change direction rollers 8l spaced apart longitudinally at the lower portion of the chamber 3.

The final reach of the belt within the crystallizing chamber is horizontally disposed and the underside of this portion of the belt is engaged by a plurality of scrapers 5 designed to sweep from the belt the crystallized caffeine while permitting the uncrystallized residue absorbed by the belt to pass from the crystallizing chamber back into the solution vat to complete its cycle of operation. The crystalline caffeine scraped from the belt is permitted to fall onto an endless conveyor 6 positioned therebelow at the bottom of the crystallizing chamber and arranged to discharge into the tray 7.

In operation it will be understood that the belt will absorb a certain amount of the solution as it passes through the vat 1 and that the water will be evaporated therefrom as the belt passes through the dehydrating chamber 2. The successive contact of this dry substance with the hot cylindrical drums 8 will cause the caffeine to separate in the form of crystals and the operation is sufficiently extensive in the crystallizing chamber to insure the separation of all of the caffeine present. The crystals thus formed are readily removed from the belt by means of the scrapers 5, as suggested, but the remaining non-crystalline substance is carried back into the solution vat. It will be appreciated, however, that it will be necessary eventually to remove the accumulation from the belt in order to restore its absorbent powers when fully loaded with the absorbed substance.

By means of the process herein suggested it is possible to obtain from a caffeine solution of any strength, practically all of the caffeine and the caffeine so obtained is of an unusually high degree of purity. The process can be performed economically as it is possible to use a low temperatured waste steam and it is only necessary occasionally to replace the cheese-cloth belt. The apparatus is simply a series of piped vats and the only power element necessary is a small motor to drive the belt.

Having thus described my invention, I claim:

1. In the art of recovering crystals of caffeine from solution containing the caffeine, the process which consists in heating the solution at a temperature slightly below its boiling point, removing the hot solution in small amounts to a dehydrating chamber, subjecting the small amount of hot solution in the dehydrating chamber to a heating at a temperature of approximately 212° F. to evaporate the surplus water and then subjecting the dried substance to a higher temperature than 210° F. to crystallize the caffeine and removing the crystalline caffeine from the residue.

2. In the art of recovering crystals of caffeine from solutions containing the caffeine, the process which consists in heating the solution at a temperature slightly below its boiling point, removing the hot solution to a dehydrating chamber, subjecting the hot solution in the dehydrating chamber to a temperature substantially that of the boiling point to evaporate the surplus water and then subjecting the dried substance to a higher temperature to crystallize the caffeine 3. In the art of recovering crystals of caffeine from caffeine solution, the process which consists in removing the water by a series of heat treatments at successively increasing temperatures and subjecting the dry residue to a temperature sufficiently high to crystallize the caffeine from the dry residue.

4. In the art of recovering crystals of caffeine from caffeine solution, the process which consists in removing the water by a series of heat treatments at successively increasing temperatures, subjecting the dry residue to a temperature sufficiently high to crystallize the caffeine from the dry residue and separating the crystals from the remaining substance.

5. In the art of recovering crystalline caffeine from a solution of caffeine, the process which consists in heating the solution in bulk removing from the bulk a continuous stream of the hot solution, subjecting the hot thin stream to a dehydrating action, and then subjecting the dehydrated substance to a heat treatment to cause the caffeine to separate therefrom in the form of crystals.

6. In the art of recovering caffeine in crystal form from a solution of caffeine, the process which consists in causing a belt of absorbent material to pick up a limited quantity of the solution, dehydrating the solution on the belt and heating the dehydrated material to crystallize the caffeine and to permit the remaining substance to remain in the belt and separating the caffeine from the residue held by the belt.

7. In the art of recovering caffeine in crystal form from a solution of caffeine, the process which consists in causing a belt of absorbent material to pick up a limited quantity of the solution, dehydrating the solution on the belt and subjecting the dehydrated material to a temperature above the boiling point of the solution to crystallize the caffeine.

8. In the art of crystallizing caffeine from a solution thereof, the process which consists in spreading a thin layer of the solution on a carrier and subjecting the thin layer to a two stage heat treatment, first to a relatively low temperatured heat at approximately the boiling point of the solution to dehydrate the solution and then to a relatively high temperature to form caffeine crystals.

9. In the art of crystallizing caffeine from a solution thereof, the process which consists in spreading a thin layer of the solution on a carrier, dehydrating the solution to form a dry substance and passing the dry substance over a heated surface having a temperature above 212° F. until the caffeine crystals appear.

10. In the art of forming caffeine crystals from a solution containing caffeine, the process which consists in dehydrating the solution and causing the residue while in a layer to contact with a hot surface having a temperature greater than the temperature used in the dehydrating step.

11. In the art of forming caffeine crystals from a solution containing caffeine, the process which consists in dehydrating the solution and causing the residue while in a layer to contact with a hot surface having a temperature greater than 212° F. in the presence of a carrier capable of absorbing the non-crystalline parts of the residue.

Signed at New York city, in the county of New York and State of New York this 31st day of December, A. D. 1919.

THEODORE SCHULZE.